(12) United States Patent
Pierce et al.

(10) Patent No.: US 10,171,395 B2
(45) Date of Patent: Jan. 1, 2019

(54) AIRCRAFT MESSAGE MANAGEMENT SYSTEM

(71) Applicant: GE Aviation Systems LLC, Grand Rapids, MI (US)

(72) Inventors: David Barnard Pierce, Grand Rapids, MI (US); Adam Veenendaal, Grand Rapids, MI (US); Brent Hooker, Saranac, MI (US); Steven Furtwangler, Caledonia, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 179 days.

(21) Appl. No.: 15/077,251

(22) Filed: Mar. 22, 2016

(65) Prior Publication Data

US 2017/0279752 A1 Sep. 28, 2017

(51) Int. Cl.
*H04L 12/58* (2006.01)
*H04L 29/08* (2006.01)
*G06Q 10/00* (2012.01)

(52) U.S. Cl.
CPC ............ *H04L 51/12* (2013.01); *G06Q 10/00* (2013.01); *H04L 67/12* (2013.01)

(58) Field of Classification Search
CPC .......... H04L 51/12; H04L 67/12; G06Q 10/10
See application file for complete search history.

(56) References Cited

U.S. PATENT DOCUMENTS

| 8,639,696 | B2 | 1/2014 | Achtermann et al. |
| 8,689,311 | B2 | 4/2014 | Blinn et al. |
| 8,769,127 | B2 | 7/2014 | Selimis et al. |
| 9,552,272 | B1* | 1/2017 | Liang ................. G06F 11/0778 |
| 9,731,815 | B2* | 8/2017 | Pangilinan ............. B64C 19/00 |
| 2005/0198313 | A1 | 9/2005 | Branigan et al. |

(Continued)

FOREIGN PATENT DOCUMENTS

WO 2011/047725 A1 4/2011

OTHER PUBLICATIONS

IBM. "Message tree structure". posted at <https://www.ibm.com/support/knowledgecenter/en/SSKM8N_8.0.0/com.ibm.etools.mft.doc/ac12610_.htm> on Mar. 5, 2016.*

(Continued)

*Primary Examiner* — Scott B Christensen
(74) *Attorney, Agent, or Firm* — GE Aviation Systems LLC; William Andes

(57) ABSTRACT

Systems and methods for filtering aircraft messages are provided. In one embodiment, the method can include receiving a message including a plurality of data fields containing data associated with the message. The method can include accessing a set of configuration data. The set of configuration data can include a set of data identifying one or more potential message structures and one or more parameters. The parameters can include one or more conditions for processing the data fields. The method can include determining a message structure of the message based at least in part on the data fields and the first set of data identifying one or more potential message structures. The method can include processing the message based at least in part on the message structure and the parameters. The method can include generating a filtered message that is based at least in part on the processed message.

20 Claims, 5 Drawing Sheets

(56) References Cited

U.S. PATENT DOCUMENTS

| | | | | |
|---|---|---|---|---|
| 2007/0300306 | A1* | 12/2007 | Hussain | G06F 21/6218 |
| | | | | 726/27 |
| 2009/0013078 | A1* | 1/2009 | Bencheikh | H04L 65/80 |
| | | | | 709/227 |
| 2014/0373121 | A1* | 12/2014 | Wied | H04L 63/0823 |
| | | | | 726/7 |
| 2016/0176512 | A1* | 6/2016 | Pangilinan | G08G 5/0021 |
| | | | | 701/3 |
| 2016/0373485 | A1* | 12/2016 | Kamble | H04L 63/20 |
| 2017/0098094 | A1* | 4/2017 | Winslow | G06F 21/6218 |

OTHER PUBLICATIONS

Rushby, "Partitioning in Avionics Architectures: Requirements, Mechanisms, and Assurance," Computer Science Laboratory, SRI International, Menlo Park, California, Mar. 1999—60 pages.

Extended European Search Report and Opinion issued in connection with corresponding EP Application No. 17161201.3 dated May 10, 2017.

\* cited by examiner

AIRCRAFT MESSAGE MANAGEMENT SYSTEM

FIELD OF THE INVENTION

The present subject matter relates generally to managing aircraft messages and more particularly to processing messages associated with an aircraft to generate filtered messages.

BACKGROUND OF THE INVENTION

Aircrafts can communicate with other aircrafts and Airline Operation Centers through air-to-air and air-to-ground communications, respectively. These communications can include information associated with a particular aircraft. For example, air-to-ground communications can include information associated with various aircraft navigational conditions and operating parameters.

In some circumstances, it can be important to eliminate at least a portion of the information included in the communications. This can allow for faster transmissions due to decreases in data size and/or more secure transmissions due to the removal of confidential information. However, it can be difficult for current systems to filter multiple types and high volumes of complex communications. While constant changes to the system source code can help, such approach can be very expensive and time-consuming.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method of filtering aircraft messages. The method can include receiving, by one or more computing devices included in an aircraft, a message including a plurality of data fields containing data associated with the message. The method can further include accessing, by the one or more computing devices, a set of configuration data. The set of configuration data can include a first set of data identifying one or more potential message structures and one or more parameters.

The parameters can include one or more conditions for processing the data fields. The method can include determining, by the one or more computing devices, a message structure of the message based at least in part on the data fields and the first set of data identifying one or more potential message structures. The method can further include processing, by the one or more computing devices, the message based at least in part on the message structure of the message and the one or more parameters. The method can include generating, by the one or more computing devices, a filtered message that is based at least in part on the processed message.

Another example aspect of the present disclosure is directed to a communications management system for filtering aircraft messages. The system can include one or more processors and one or more memory devices included in an aircraft. The one or more memory devices can store instructions that when executed by the one or more processors cause the one or more processors to perform operations. The operations can include receiving a message that can include one or more data fields containing data associated with the message from at least one of a first onboard system associated with the aircraft or a first remote system that is remote from the aircraft. The operations can further include accessing a set of configuration data. The set of configuration data can include one or more parameters. The parameters can include one or more conditions for editing the data fields. The operations can include editing one or more of the data fields to perform at least one of a removal, redaction, or replacement of the data associated with the message contained in the respective data fields based at least in part on the one or more conditions. The operations can further include generating a filtered message that is based at least in part on the edited data fields. The operations can include outputting the filtered message to at least one of a second onboard system associated with the aircraft or a second remote system that is remote from the aircraft.

Yet another example aspect of the present disclosure is directed to an aircraft. The aircraft can include one or more onboard systems configured to send one or more messages associated with the aircraft. The aircraft can further include a computing system comprising one or more processors and one or more memory devices located on the aircraft. The one or more memory devices can store instructions that when executed by the one or more processors cause the one or more processors to perform operations. The operations can include receiving a message from at least one of the onboard systems. The message can include a plurality of data fields containing data associated with the message. The operations can further include accessing a set of configuration data. The set of configuration data can include a set of data associated with one or more potential message types, a set of data identifying one or more potential message structures, and one or more parameters. The parameters can include one or more conditions for processing the data fields. The operations can further include determining a message type of the message based at least in part on the set of data associated with the one or more potential message types. The operations can include determining a message structure of the message based at least in part on the message type, the data fields, and the set of data identifying one or more potential message structures. The operations can further include processing one or more of the data fields based at least in part on the message structure of the message and the one or more parameters. The operations can include generating a filtered message that is based at least in part on the processed data fields.

Other example aspects of the present disclosure are directed to systems, methods, aircraft, avionics systems, devices, non-transitory computer-readable media for filtering aircraft messages.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
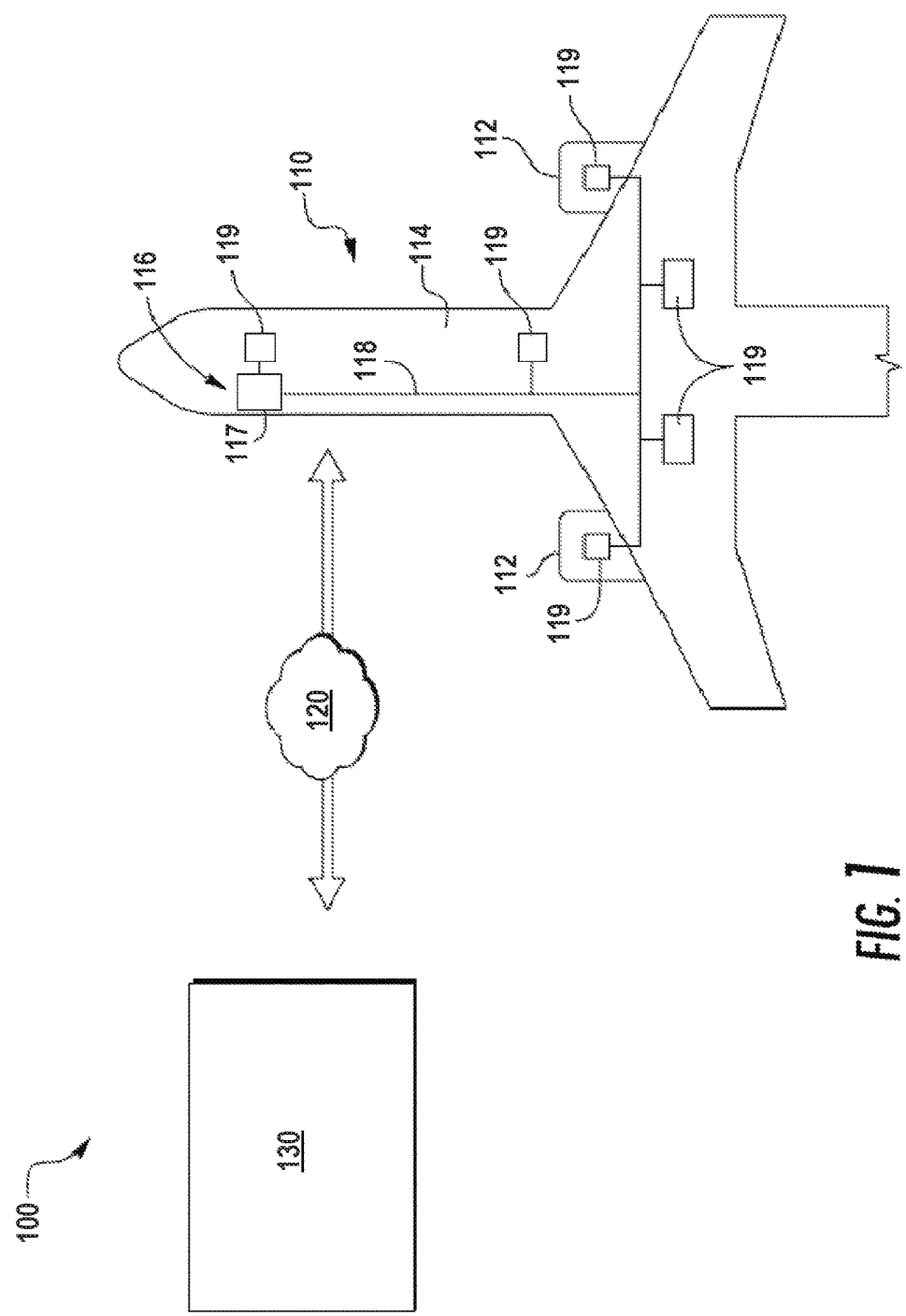
FIG. 1 depicts an example system according to example embodiments of the present disclosure.

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods for filtering aircraft messages. For instance, a communications management system onboard an aircraft can receive various types of aircraft messages from other onboard systems (e.g., a navigational system) or remote computing systems (e.g., a ground-based system, satellite, another aircraft). The communications management system can be configured to process a message based on a set of configuration data. The configuration data can be included in an XML formatted file, which the communications management system can convert to a binary data structure that can be quickly read, in real-time. Using the configuration data, the communications management system can identify the message type (e.g., a GPS message) and a message structure (e.g., a tree data structure) associated with the received message. The communications management system can process the message by examining the data fields of the message and editing the data contained therein based on filtering conditions set forth in the configuration data. The communications management system can then generate a filtered message (e.g., including the edited data fields) and output the filtered message to another onboard system or remote computing system.

More particularly, the communications management system can receive a message including a plurality of data fields containing data associated with the message. In some implementations, the communications management system can receive the message from a first onboard system (e.g., a navigation system) associated with the aircraft or a first remote system (e.g., a ground-based system, system of another aircraft) that is remote from the aircraft.

To help process the message, the communications management system can access a set of configuration data. The configuration data can include, for instance, one or more parameter(s) that set forth conditions for processing the data fields of the message. In some implementations, the configuration data can be included in an XML formatted file and provided to the communications management system. The communications management system can convert the XML formatted file to a binary data structure that can be read by the communications management system to process the message.

For example, the communications management system can be configured to verify an origin of the message. The configuration data can include a set of data for verifying message origin. In some implementations, the set of verification data can include one or more identifier(s) such as, metadata, authentication codes, signatures, etc. that can be used to verify the origin of the message. The communications management system can use the set of verification data and examine the data contained in the message data fields to verify that the message originated from a particular onboard system, such as a navigational system.

The communications management system can also determine a message type associated with the message using the configuration data. The configuration data can include a set of data associated with one or more potential message type(s). For example, the set of data associated with the potential message type(s) can identify types of data (e.g., coordinate data) that can be expected to be included in the message, if it is a GPS message. The communication management system can use this data and examine the message to determine that the message is a GPS message.

The communications management system can validate the message based, at least in part, on a set of validation conditions included in the configuration data. In one example, the validation conditions can include one or more boundary condition(s) (e.g., 180 W to 180 E) associated with the coordinate data of a GPS message. In the event the message is a GPS message, the communications management system can validate the message by determining whether coordinate data of the message satisfies the boundary condition(s). If so, the message can be considered valid. If not, the communications management system can determine that the message is invalid and delete the message.

The communications management system can determine a message structure of the message based, at least in part, on the data fields of the message and the configuration data. In some implementations, the configuration data can include a set of data identifying one or more potential message structure(s). By way of example, the message can be a GPS message. The set of data identifying the potential message structure(s) can identify a tree data structure as a potential data structure of a GPS message. The communications management system can examine the data fields of the message and determine that the message (e.g., a GPS message) has a tree data structure.

The configuration data can also be used by the communications management system to process the message. The configuration data can include one or more parameter(s) for processing a message. The parameter(s) can include one or more condition(s) (e.g., if/then statements) for editing the data fields of the message and the data contained therein. The communications management system can be configured to access the parameter(s) and process one or more of the data field(s) based, at least in part, on the message structure of the message and the parameter(s).

For instance, the communications management system can be configured to process the data field(s) of a message's tree data structure. As the communications management system moves through the tree data structure, it can edit one or more of the data field(s) to perform at least one of a removal, redaction, or replacement of the data associated with the message contained in the respective data fields. Such editing can be based, at least in part, on the one or more condition(s). By way of example, one of the condition(s) for editing a GPS message can include: "if data includes an aircraft heading, then remove data in data field." Applying the condition, the communications management system can remove aircraft heading data from the data field(s) of the message as it processes the message.

The communications management system can generate a filtered message that is based, at least in part, on the processed message. The filtered message can include one or more of the edited data field(s). The communications management system can output the filtered message to another onboard system associated with the aircraft and/or another remote computing system.

The systems and methods according to example aspects of the present disclosure can filter aircraft messages in a time efficient and cost effective manner. More particularly, the systems and methods can filter messages based on configuration data and without requiring that new software be added to the system's executables when messages are received. As a result, the systems and methods can filter complex messages, even for high throughput on communications networks without altering source code. In this way, the systems and methods according to example aspects of the present disclosure have a technical effect of filtering aircraft messages in a more efficient manner by increasing the flexibility and configurability of the filter computing system, while decreasing the costs associated with reliably filtering various types of messages.

FIG. 1 depicts an example system 100 according to example embodiments of the present disclosure. As shown, the system 100 can include an aircraft 110, one or more communication network(s) 120, and a remote computing system 130. The aircraft 110 can include one or more engine(s) 112, a fuselage 114, and a communications management system 116.

As shown in FIG. 1, the communications management system 116 can include one or more computing device(s) 117 that can be associated with, for instance, an avionics system. The one or more computing device(s) 117 can be included in the aircraft 110. The computing device(s) 117 can be coupled to a variety of systems on the aircraft 110 over a network 118. The network 118 can include a data bus or combination of wired and/or wireless communication links.

The computing device(s) 117 can be configured to employ a partitioned operating system. In a partitioned operating system, memory and computer processing (CPU) time can be divided among allocated partitions (e.g., each for separate computing applications). For example, such partitioning can allow a single processor to function as several sub-processors, thereby isolating the subsystems. Partitions can be set up for each part of the system such that each application (run on the computing device(s) 117) can potentially have a certain resources (e.g., an amount of memory, an amount of processing time) allocated to it. Thus, an application can remain unaffected by errors that may occur with other applications running concurrently. In some implementations, each partition can be limited to its initial fixed memory allocation, which cannot be changed at a later time. Moreover, each partition can include multiple threads, multiple processes, or both, if supported.

The partitioned operating system can also be deterministic. More specifically, the partitioned operating system can ensure that each partition will have dedicated resources (e.g., processing time, memory, I/O) necessary for an application to run on the computing device(s) 117. For instance, the aircraft 110 can include one or more onboard system(s) 119 that can be in communication with the computing device(s) 117 of the communications management system 116. In some implementations, the onboard system(s) 119 can be configured to perform various aircraft operations and control and/or monitor various settings and parameters associated with the aircraft 110. For instance, the onboard system(s) 119 can be associated with navigation systems (e.g., global positioning systems), aircraft control systems, flight management systems, aircraft maintenance systems, data acquisition systems, a flight recorder, monitoring systems, and/or other systems of the aircraft 110. Each onboard system(s) 119 can be associated with a partition such that it will have the dedicated resources to operate.

By way of example, a first onboard system (e.g., a navigation system) can be associated with a first partition and second first onboard system (e.g., a flight management system) can be associated with a second partition. The computing device(s) 117 can isolate the first and second onboard systems by partitioning its processors. This can help prevent a failure associated with the first onboard system from affecting the second onboard system. Moreover, the computing device(s) 117 can allocate computing resources to both the first partition and the second partition so that the first onboard system (e.g., a navigation system) and the second first onboard system (e.g., a flight management system) will have the necessary resources to operate. In this way, the first onboard system cannot overuse the resource(s) of the second onboard system and prevent proper operation of the second onboard system. Accordingly, the computing device(s) 117 can meet FAA regulations directed to deterministic computing requirements.

The computing device(s) 117 and the remote computing system 130 can be configured to communicate between one another via the communications network(s) 120. The remote computing systems 130 can be associated with, for instance, the computing systems of a ground-based communication system and/or the computing system of another aircraft or vehicle. The communications network(s) 120 can include at least one of a SATCOM network, VHF network, a HF network, a Wi-Fi network, a WiMAX network, a gatelink network, and/or any other suitable communications network for transmitting messages to and/or from an aircraft.

The onboard system(s) 119 and/or the remote computing system 130 can be configured to send one or more message(s) associated with the aircraft 110 to the computing device(s) 117. The message(s) can be sent automatically and/or manually, with and/or without user input. The computing device(s) 117 can be configured to receive the one or more message(s) from the onboard system(s) 119 and/or the remote computing system 130. As further described herein, the computing device(s) 117 can be configured to process the data included in the one or more message(s) and generate a filtered message from the processed data. The computing device(s) 117 can be configured to output the filtered message to the system that sent the message and/or to a second, separate onboard system and/or remote computing system.

Figure 2:
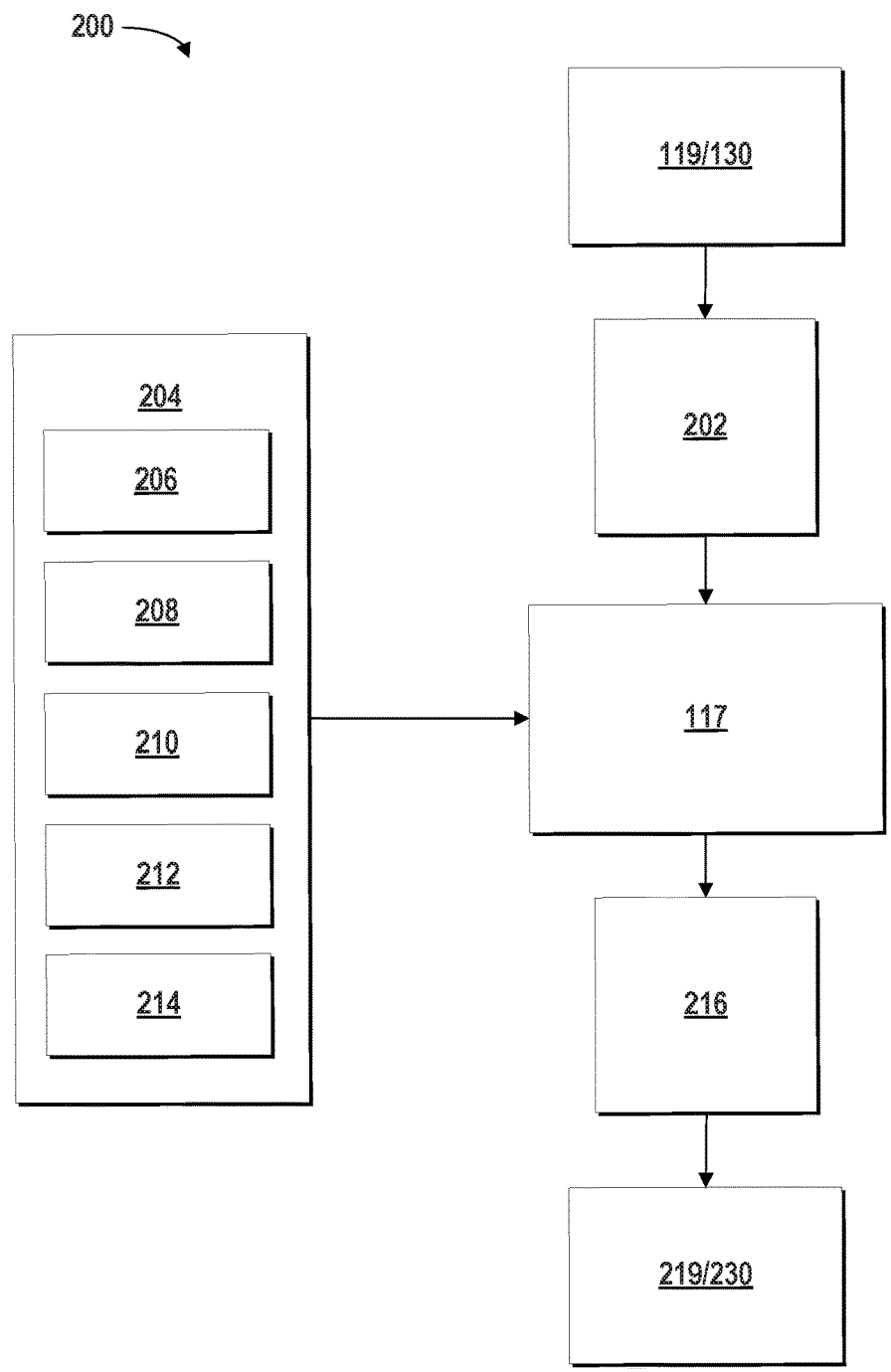
FIG. 2 depicts an example system for filtering aircraft messages according to example embodiments of the present disclosure.

FIG. 2 depicts an example system 200 for filtering aircraft messages according to example embodiments of the present disclosure. As shown, an onboard system 119 or a remote computing device 130 (e.g., of another aircraft) can send a message 202 to the computing device(s) 117 of the communication management system 116. By way of example, the onboard system 119 can be a navigation system that can send the message 202 to the computing device(s) 117.

The message 202 can be associated with various message types. For example, in the event that the message 202 is sent by a navigation system, the message 202 can be a global positioning system (GPS) message. In another example, the message 202 can be an equipment health and maintenance type message, such as a message related to the heath and maintenance of the engine(s) 112. In other examples, the message 202 can be an OOOI (out of the gate, off the ground, on the ground, and into the gate) event type message, a flight plan update type message, etc.

Figure 3:
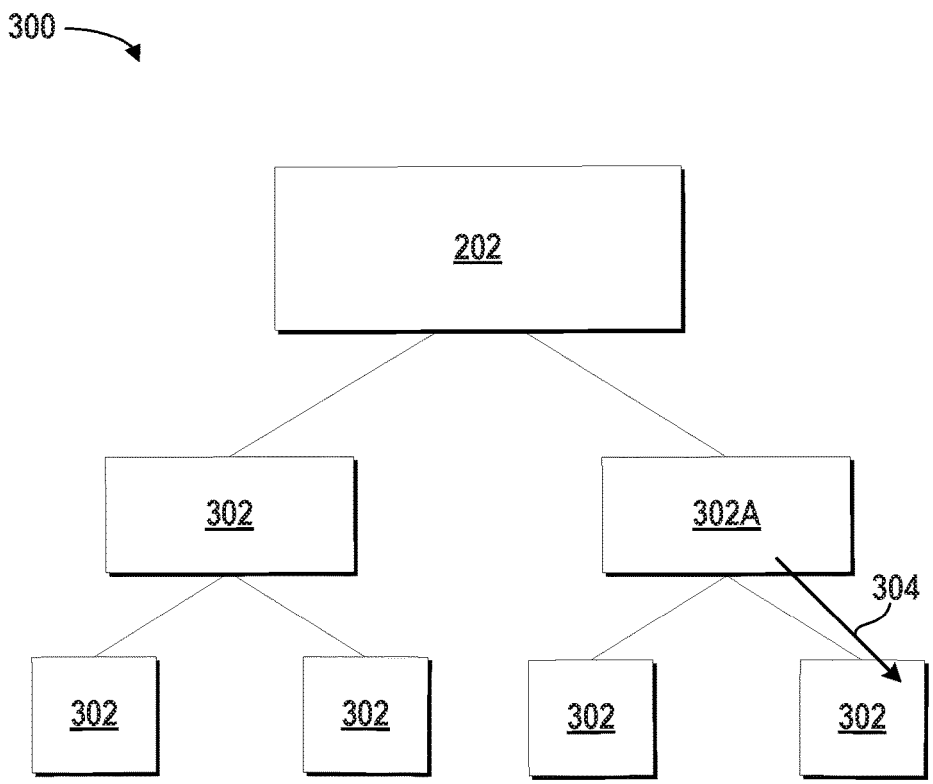
FIG. 3 depicts an example message data structure according to example embodiments of the present disclosure.

The message 202 can include a message structure 300, as shown for example in FIG. 3. In some implementations, the message structure 300 can be a tree data structure. The message 202 can include a plurality of data fields 302, one or more of which can contain data associated with the message 202. For example, in the event that the message 202 is a GPS message, one or more data field(s) 302 can include data associated with the coordinates of the aircraft 110, data associated with the orientation of the aircraft 110, data associated with the heading of the aircraft 110, data associated with the time the message 202 was sent, data associated with the flight number, etc.

In some implementations, one or more data field(s) 302 of the message 202 can include links (e.g., pointers, references, metadata) to one or more other data field(s) of message 202. For instance, the message 202 can include a first data field 302A and a second data field 302B. The first data field 302A can include a link 304 to the second data field 302B which can be used by the computing device(s) 117 for processing the message 202, as further described herein.

Returning to FIG. 2, the computing device(s) 117 of the communications management system 116 can be configured to receive the message 202 from at least one of a first onboard system 119 associated with the aircraft 110 or a first remote system 130 that is remote from the aircraft 110. For example, in some implementations, the computing device(s) 117 can be configured to receive the message 202 in a plurality of data packets. The computing device(s) 117 can be configured to then compile the data packets into the message 202.

The operations of the computing device(s) 117 can be configured, based at least in part, on a set of configuration data 204. For example, the set of configuration data 204 can be included in an XML, formatted file. The set of configuration data 204 can be provided (e.g., sent, uploaded, downloaded) to the computing device(s) 117 in the XML, formatted file, which can be validated by an XML schema. The computing device(s) 117 can convert the XML formatted file to a binary data structure that can be quickly read by the computing device(s) 117 in real-time to process the message 202, as further described herein.

The set of configuration data 204 can include various types of information that can be accessed by the computing device(s) 117. For example, the configuration data 204 can include a set of data 206 associated with one or more potential message type(s) (e.g., a GPS message, a 0001 event message), a set of data 208 identifying one or more potential message structure(s) (e.g., a tree data structure), one or more parameter(s) 210 for processing the data fields of the message 202, a set of condition(s) 212 for validating the message 202, and/or a set of data 214 for verifying an origin of the message 202.

The computing device(s) 117 can be configured to access the set of configuration data 204 to determine a message type of the message 202. For example, the computing device(s) 117 can be configured to determine the message type of the message 202 based, at least in part, on the set of data 206 associated with the one or more potential message type(s). The set of data 206 associated with the potential message type(s) can list the types of messages that can be expected to be received by the computing device(s) 117. In one example, one of the potential message type(s) can include a GPS message. The set of data 206 associated with the potential message type(s) can identify, for instance, types of data that can be expected to be included in the message 202, if it is a GPS message. Using the set of data 206, the computing device(s) 117 can examine the message 202 (e.g., a header, body, one or more data field(s) 302) to determine if the message 202 is a GPS message.

The computing device(s) 117 can further be configured to determine a message structure associated with the message 202 based, at least in part, on the message type, the data fields 302, and/or the set of data 208 identifying one or more potential message structure(s). For instance, the set of data 208 identifying one or more potential message structure(s) can include potential message structures that can be associated with a particular message type. The computing device(s) 117 can be configured to access this set of data 208 and examine the data fields 302 of the message 202. Accordingly, computing device(s) 117 can be configured to determine the message 202 has a message structure 300 (e.g., a tree structure) based, at least in part, on the data fields 302 and the set of data 208 identifying the one or more potential message structure(s).

The computing device(s) 117 can be configured to validate the message 202. The set of configuration data 204 can include a set of conditions 212 for validating the message 202. The set of validating conditions 212 can include, for instance, boundary conditions, limitations, etc. of the data associated with the message 202.

The computing device(s) 117 can be configured to access the set of validating conditions 212 and to validate the message 202 based, at least in part, on the message type, the data associated with the message 202, and/or the set of validating condition(s) 212. For example, longitudinal coordinates associated with a GPS message can range from 180 W to 180 E. For a GPS message, the set of validating conditions 212 can include such coordinate boundaries. The computing device(s) 117 can be configured to access the set of validating conditions 212 and process the data associated with the message 202 to determine if any of the coordinate data included in the data field(s) 302 falls outside of the 180 W to 180 E boundaries. If so, the computing device(s) 117 can be configured to determine that at least a portion of the message 202 is invalid. However, if the data associated with the message 202 satisfies the set of validating conditions 212, the computing device(s) 117 can be configured to determine that at least a portion of the message 202 is valid.

The computing device(s) 117 can be configured to verify the origin of the message 202. The set of configuration data 204 can include a set of data 214 for verifying message origin. In some implementations, the set of verification data 214 can include one or more identifier(s) such as, certain data types, metadata, authentication codes, signatures, keys, etc. that can be used by the computing device(s) 117 to verify the origin of the message 202 (e.g., an onboard system 119, another aircraft, a ground-based system).

The computing device(s) 117 can be configured to access the set of verification data 214 and verify an origin of the message 202 based, at least in part, on the data associated with the message 202 and/or the set of data 214 for verifying message origin. For example, the computing device(s) 117 can be configured to use the identifier(s) and examine the data associated with the message 202 contained in a header, body, data fields 302, etc. to verify that the message 202 (e.g., a GPS message) originated from and/or was sent by an onboard system 119 (e.g., a navigational system).

The computing device(s) 117 can be configured to process the message 202. The set of configuration data 204 can include one or more parameter(s) 210 for processing the message 202. The parameter(s) 210 can include one or more condition(s) for editing the data fields 302 and the data contained therein. The computing device(s) 117 can be configured to access the parameter(s) 210 and process one or more of the data field(s) 302 based, at least in part, on the message structure of the message 202 and/or the one or more parameter(s) 210.

For instance, the computing device(s) 117 can be configured to process one or more data field(s) 302 of the tree data structure (e.g., as shown in FIG. 3). As it moves through the tree data structure, the computing device(s) 117 can be configured to edit one or more of the data field(s) 302 to perform at least one of a removal, redaction, or replacement of the data associated with the message 202 contained in the respective data fields 302 based, at least in part, on the one or more condition(s).

By way of example, for a GPS message, the parameter(s) 210 can include condition(s) such as: "if data includes an aircraft heading, then remove data in data field," "if coordinate data is less than 120 W, then redact data in data field," "if data includes flight number, then replace with 0," etc. The computing device(s) 117 can edit the data fields 302 of the message 202 based on these condition(s). For instance, in the event that the data contained in the data field 302 includes data associated with the heading of aircraft 110, the computing device(s) 117 can be configured to remove the data from the data field 302, thereby leaving the data field 302 empty and/or eliminating the data field 302. In the event that a data field 302 includes coordinates such as 42.6 N, 114.5 W, the computing device(s) 117 can be configured to redact one or more of the coordinate(s) such that it is obscure and computationally illegible. In the event that the data contained in a data field 302 includes a flight number associated with the aircraft 110, the computing device(s) 117 can be configured to replace the data with a fixed value (e.g., 0) that cannot be deciphered to determine the flight number.

In some implementations, the data associated with the message 202 and contained in the data field(s) 302 can include sensitive data. Sensitive data can include data associated with confidential and/or classified information (e.g., data associated with military aircrafts). In such a case, the parameter(s) 210 can include one or more condition(s) to remove, redact, or remove sensitive data from the data fields 302 of the message 202.

The computing device(s) 117 can be configured to generate a filtered message 216 based, at least in part, on the processed data fields. For instance, the computing device(s) 117 can be configured to generate a filtered message 216 that includes the data fields 302 that have been edited by the computing device(s) 117 and/or the data fields 302 that have not been edited by the computing device(s) 117. By way of example, in the event that the filtered message 216 is a filtered GPS message, the filtered message 216 can include the data fields 302 in which the data (e.g., a flight number) has been replaced with a fixed value and/or data fields 302 that were unaffected by the conditions set forth in the parameter(s) 210. In this way, the computing device(s) 117 can be configured to generate a filtered message 216 that is based, at least in part, on the edited data fields 302 (and/or the unedited data fields 302).

The computing device(s) 117 can be configured to output the filtered message 216 to at least one of a second onboard system 219 associated with the aircraft 110 and/or a second remote system 230 that is remote from the aircraft 110. For example, the computing device(s) 117 can be configured to break the filtered message 216 into data packets and send the data packets the second onboard system 219 and/or the second remote system 230. The second onboard system 219 can be separate and/or different from the first onboard system 119 that sent the message 202 to the computing device(s) 117. The second remote system 230 can be separate and/or different from the first remote system 130 that sent the message 202 to the computing device(s) 117.

Figure 4:
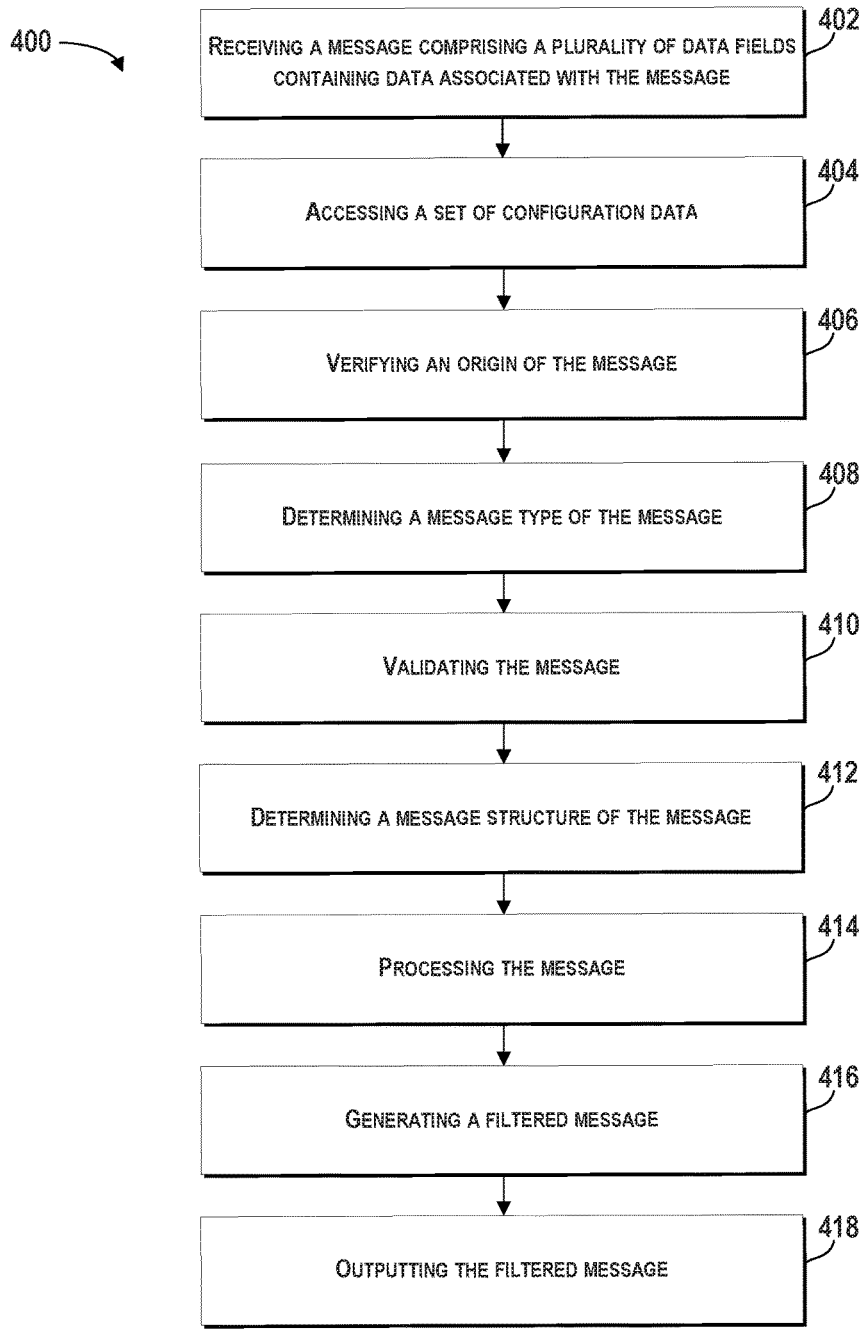
FIG. 4 depicts a flow diagram of an example method for filtering aircraft messages according to example embodiments of the present disclosure.

FIG. 4 depicts a flow diagram of example method 400 for filtering aircraft messages according to example embodiments of the present disclosure. FIG. 4 can be implemented by one or more computing device(s), such as the computing device(s) 117 depicted in FIGS. 1 and 5. One or more step(s) of the method 400 can be performed by the one or more computing device(s) 117 employing a partitioned operating system. Moreover, one or more step(s) of the method 400 can be performed while aircraft 110 is in-flight. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (402), the method 400 can include receiving a message comprising a plurality of data fields containing data associated with the message. For instance, the computing device(s) 117 included in the aircraft 110 can receive a message 202 including a plurality of data fields 302 containing data associated with the message 202. In some implementations, the computing device(s) 117 can receive the message 202 from at least one of a first onboard system 119 (e.g., a navigation system) associated with the aircraft 110 and/or a first remote system 130 (e.g., a ground-based system, system of another aircraft) that is remote from the aircraft 110.

At (404), the method 400 can include accessing a set of configuration data. For instance, the computing device(s) 117 can access the set of configuration data 204. The set of configuration data 204 can include, for example, a set of data 208 identifying one or more potential message structure(s) and one or more parameter(s) 210. The parameters 210 can include one or more condition(s) for processing the data fields 302. In some implementations, the set of configuration data 204 can be included in an XML formatted file and provided to the computing device(s) 117. The computing device(s) 117 can convert the XML formatted file to a binary data structure that can be read by the computing device(s) 117 to process the message 202.

At (406), the method 400 can include verifying an origin of the message. For instance, the set of configuration data 204 can include a set of data 214 for verifying message origin. The computing device(s) 117 can verify an origin of the message 202 based, at least in part, on the data associated with the message 202 and the set of data 214 for verifying message origin. For example, the computing device(s) 117 can use the set of verification data 214 (e.g., including identifiers) and examine the data associated with the message 202 contained in the data fields 302 to verify that the message 202 originated from and/or was sent by a particular onboard system 119, such as a navigational system.

At (408), the method 400 can include determining a message type of the message. The configuration data 204 can include a set of data 206 associated with one or more potential message type(s) that can be received by the computing device(s) 117. The computing device(s) 117 can determine a message type of the message 202 based, at least in part, on the set of data 206. For example, the set of data 206 associated with the potential message type(s) can identify types of data that can be expected to be included in the message 202, if it is a GPS message. The computing device(s) 117 can use the set of data 206 and examine the data associated with the message 202 to determine that the message 202 is a GPS message.

At (410), the method 400 can include validating the message. For instance, the configuration data 204 can include a set of conditions 212 for validating the message 202. The computing device(s) 117 can validate the message 202 based, at least in part, on the message type, the data associated with the message 202, and/or the set of conditions 212 for validating the message 202. For example, the set of validation conditions 212 can include one or more boundary condition(s) (e.g., 180 W to 180 E) associated with the coordinate data of a GPS message. In the event that the message 202 is a GPS message, the computing device(s) 117 can validate the message 202 by determining whether coordinate data of message 202 satisfies the boundary condition(s). If so, the computing device(s) 117 can determine that at least a portion of the message 202 is valid.

However, if the data associated with the message 202 does not satisfy the set of validating conditions 212, the computing device(s) 117 can determine that the message 202 is invalid. In some implementations, the computing device(s) 117 can delete an invalid message. In some implementations, the computing device(s) 117 can store the invalid message in a memory device. Additionally, and/or alternatively, the computing device(s) 117 can output a message to the sender of the message 202 indicating the invalidity of the message 202. Although, in some implementations, such message may not be desirable if the sender of message 202 is associated with a nefarious entity.

At (412), the method 400 can include determining a message structure of the message. For instance, the computing device(s) 117 can determine a message structure 300 of the message 202 based, at least in part, on the data fields 302 of the message 202 and/or the set of data 208 identifying one or more potential message structure(s). As indicated above, the set of data 208 identifying one or more potential message structure(s) can include potential message structures that can be associated with a particular message type. By way of example, the message 202 can be a GPS message. The set of data 208 identifying the potential message structure(s) can identify a tree data structure as a potential data structure of a GPS message. The computing device(s) 117 can examine one or more data field(s) 302 of the message 202 and determine that the message 202 has a tree data structure associated with a GPS message.

At (414), the method 400 can include processing the message. The computing device(s) 117 can process the message 202 based, at least in part, on the message type of the message 202, the message structure 300 of the message 202, and/or the one or more parameter(s) 210. In some implementations, the computing device(s) 117 can process the message 202 by editing one or more of the data field(s) 302 to perform at least one of a removal, redaction, or replacement of the data contained in the respective data field(s) 302 based, at least in part, on the one or more condition(s) set forth in the parameter(s) 210.

By way of example, the message 202 can be a GPS message and include a message structure 300 that is a tree data structure. The message structure 300 can include a first data field 302A that contains, for example, coordinate data associated with the aircraft 110 (e.g., 42.6 N, 114.5 W) and a second data field 302B that contains, for example, a flight number associated with the aircraft 110. The first data field 302A can also include a link 304 to the second data field 302B. The parameter(s) 210 can include the conditions: "if coordinate data is less than 120 W, then redact data in data field" and "if data is includes flight number, then replace with 0".

The computing device(s) 117 can process the message 202 by moving through the tree data structure of the message 202 to process one or more of the data field(s) 302. For instance, based on the condition(s) of the parameter(s) 210, the computing device(s) 117 can process the first data field 302A. The computing device(s) 117 can redact at least the longitudinal coordinate data contained in the first data field 302A that is less than 120 W. The computing device(s) 117 can determine to process the second data field 302B based, at least in part, on the link 304 to the second data field 302B and/or the data contained in the first data field 302A. The computing device(s) 117 can process the second data field 302B, for example, to replace the data associated with the flight number of aircraft 110 with a "0".

At (416), the method 400 can include generating a filtered message. For instance, the computing device(s) 117 can generate a filtered message 216 that is based, at least in part, on the processed message 202. As indicated above, the filtered message 216 can include the processed data field(s) such as, for example, first data field 302A and second data field 302B. Additionally, and/or alternatively, the filtered message 216 can include data and/or data field(s) 302 that have not been edited by the computing device(s) 117.

At (418), the method 400 can include outputting the filtered message 216. For instance, the computing device(s) 117 can output the filtered message 216 to at least one of a second onboard system 219 associated with the aircraft 110 or a second remote system 230 that is remote from the aircraft 110. In some implementations, the computing device(s) 117 can break the filtered message 216 into a plurality of data packets for transmission, and output the data packets.

Figure 5:
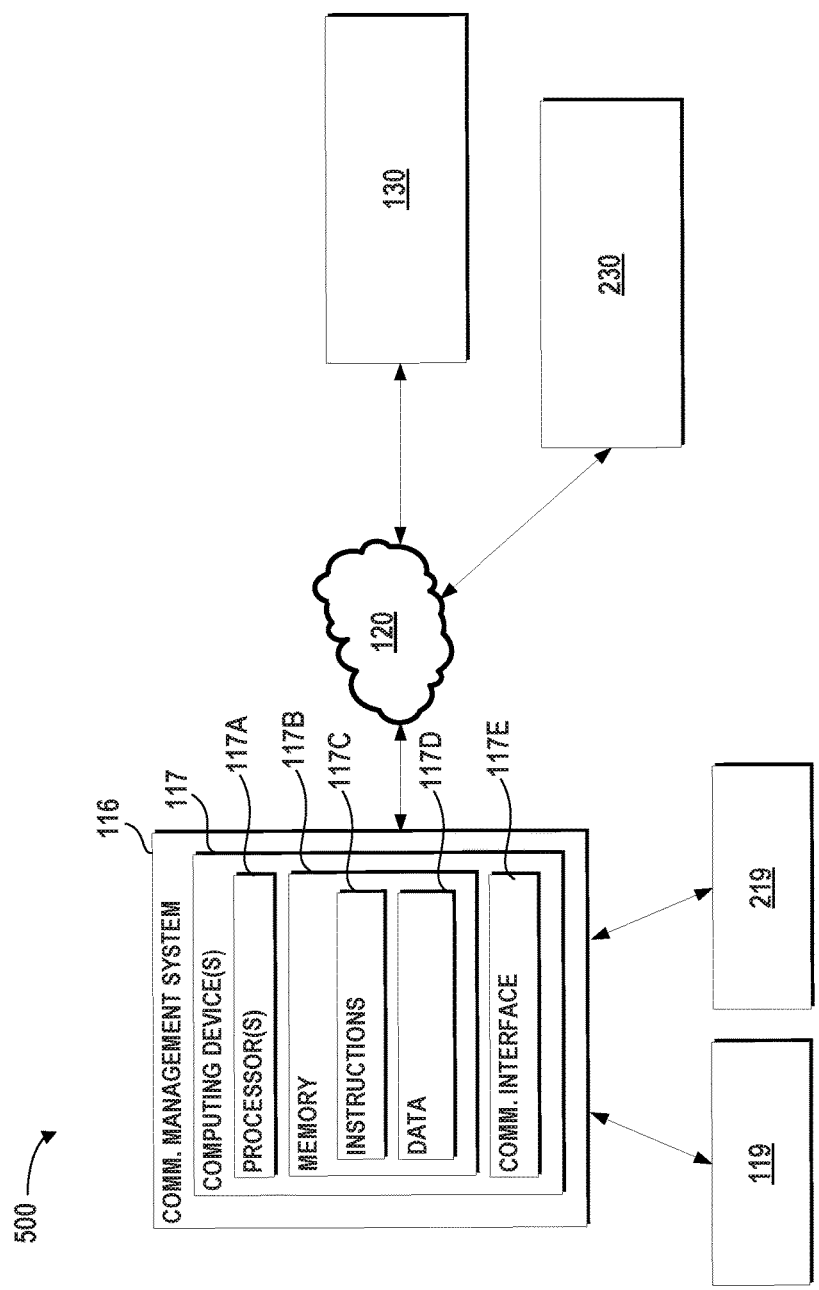
FIG. 5 depicts an example system according to example embodiments of the present disclosure.

FIG. 5 depicts an example system 500 according to example embodiments of the present disclosure. The system 500 can include the communications management system 116, the first and second onboard system(s) 119, 219, and the first and second remote computing devices 130, 230. The remote computing systems 130, 230 can be located at a remote location that is separated and remote from the communications management system 116 located onboard the aircraft 110. For instance, the remote computing systems 130, 230 can be associated with a ground-based system of an aircraft operations center or a computing system of another aircraft. The communications management system 116 and the remote computing systems 130, 230 can be configured to communicate via the communications networks 120.

As shown, the communications management system 116 can include one or more computing device(s) 117. The computing device(s) 117 can include one or more processor(s) 117A and one or more memory device(s) 117B. The one or more processor(s) 117A can include any suitable processing device, such as a microprocessor, microcontroller, integrated circuit, logic device, or other suitable processing device. The one or more memory device(s) 117B can include one or more computer-readable media, including, but not limited to, non-transitory computer-readable media, RAM, ROM, hard drives, flash drives, or other memory devices.

The one or more memory device(s) 117B can store information accessible by the one or more processor(s) 117A, including computer-readable instructions 117C that can be executed by the one or more processor(s) 117A. The instructions 117C can be any set of instructions that when executed by the one or more processor(s) 117A, cause the one or more processor(s) 117A to perform operations. The instructions 117C can be software written in any suitable programming language or can be implemented in hardware. In some embodiments, the instructions 117C can be executed by the one or more processor(s) 117A to cause the one or more processor(s) 117A to perform operations, such as the operations for filtering aircraft messages, as described herein, and/or any other operations or functions of the one or more computing device(s) 117. Additionally, and/or alternatively, the instructions 117C can be executed in logically and/or virtually separate threads on processor 117A. The memory device(s) 117B can further store data 117D that can be accessed by the processors 117A. For example, the data 117D can include the set of configuration data 204, data associated with one or more message(s), etc.

The computing device(s) 117 can also include a network interface 117E used to communicate, for example, with the other components of system 500. The network interface 117E can include any suitable components for interfacing with one more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of filtering aircraft messages, comprising:
   receiving, by one or more computing devices included in an aircraft from at least one of a first onboard system associated with the aircraft or a first remote system that is remote from the aircraft, a message comprising a plurality of data fields containing data associated with the message;
   accessing, by the one or more computing devices, a set of configuration data, wherein the set of configuration data comprises a first set of data identifying a plurality of different message types, one or more message structures that can be associated with each of the different message types, and different parameters associated with each of the different message structures including one or more conditions for processing data fields of messages associated with each of the of the message structures, wherein each condition includes an action to be performed on a specified data field;
   determining, based on the plurality of data fields included in the message including expected data fields matching one of the plurality of message types, a potential message type of the message;
   determining, by the one or more computing devices, a determined message structure of the message based at least in part on the data fields and the determined potential message type;
   processing, by the one or more computing devices, the message based at least in part on the determined message structure, and wherein processing comprises:
      identifying one or more parameters associated with the determined message structure, and
      accessing and editing, by the one or more computing devices, one or more of the data fields to perform an identified action including at least one of a removal, redaction, or replacement of the data contained in the respective data fields based at least in part on the one or more conditions associated with the one or more potential message types; and
   generating and outputting, by the one or more computing devices, a filtered message that is based at least in part on the processed message.

2. The computer-implemented method of claim 1, wherein the one or more computing devices employ a partitioned operating system.

3. The computer-implemented method of claim 1, wherein the set of configuration data is included in an XML formatted file.

4. The computer-implemented method of claim 1, wherein the message structure of the message is a tree data structure comprising a first data field and a second data field, wherein the first data field comprises a link to the second data field, and wherein processing, by the one or more computing devices, the message comprises:
   processing, by the one or more computing devices, the first data field;
      determining, by the one or more computing devices, to process the second data field based at least in part on the link to the second data field; and
      processing, by the one or more computing devices, the second data field.

5. The computer-implemented method of claim 1, wherein the set of configuration data includes a second set of data associated with the one or more potential message types, and wherein the method further comprises:
   determining, by the one or more computing devices, a message type of the message based at least in part on the second set of data associated with the one or more potential message types; and
   processing, by the one or more computing devices, the message based at least in part on the message type.

6. The computer-implemented method of claim 5, wherein the set of configuration data includes a second set of conditions for validating the message, and wherein the method further comprises:

validating, by the one or more computing devices, the message based at least in part on the message type, the data associated with the message, and the second set of conditions.

7. The computer-implemented method of claim 1, further comprising:
  validating, prior to accessing and editing, the message based at least in part on the one or more conditions associated with the one or more potential message types, wherein, for an invalid method, the validating performs at least one of deleting the message and outputting a message to a sender of the message indicting the invalidity of the invalid message.

8. The computer-implemented method of claim 7, further comprising:
  outputting, by the one or more computing devices, the filtered message to at least one of a second onboard system associated with the aircraft or a second remote system that is remote from the aircraft.

9. The computer-implemented method of claim 1, wherein the configuration data includes a second set of data for verifying message origin, and wherein the method further comprises:
  verifying, by the one or more computing devices, an origin of the message based at least in part on the data associated with the message and the second set of data for verifying message origin.

10. A communications management system for filtering aircraft messages, the system comprising one or more processors and one or more memory devices included in an aircraft, the one or more memory devices storing instructions that when executed by the one or more processors cause the one or more processors to perform operations, the operations comprising:
  receiving, by one or more computing devices included in an aircraft from at least one of a first onboard system associated with the aircraft or a first remote system that is remote from the aircraft, a message comprising a plurality of data fields containing data associated with the message;
  accessing, by the one or more computing devices, a set of configuration data, wherein the set of configuration data comprises a first set of data identifying a plurality of different message types, one or more message structures that can be associated with each of the different message types, and different parameters associated with each of the different message structures including one or more conditions for processing data fields of messages associated with each of the message structures, wherein each condition includes an action to be performed on a specified data field;
  determining, based on the plurality of data fields included in the message including expected data fields matching one of the plurality of message types, a potential message type of the message;
  determining, by the one or more computing devices, a determined message structure of the message based at least in part on the data fields and the determined potential message type;
  processing, by the one or more computing devices, the message based at least in part on the determined message structure, and wherein processing comprises:
    identifying one or more parameters associated with the determined message structure,
    accessing and editing, by the one or more computing devices, one or more of the data fields to perform an identified action including at least one of a removal, redaction, or replacement of the data contained in the respective data fields based at least in part on the one or more conditions associated with the one or more potential message types, and
  generating and outputting, by the one or more computing devices, a filtered message that is based at least in part on the processed message.

11. The communications management system of claim 10, wherein the set of configuration data further comprises a set of data identifying one or more potential message structures, and wherein the operations further comprise:
  determining a message structure of the message based at least in part on the one or more data fields and the set of data identifying the one or more potential message structures.

12. The communications management system of claim 10, wherein the set of configuration data is included in an XML formatted file.

13. The communications management system of claim 12, wherein the operations further comprise:
  converting the XML formatted file to a binary data structure to be read in real-time.

14. The communications management system of claim 10, wherein the set of configuration data includes a set of data associated with one or more potential message types, and wherein the operations further comprise:
  determining a message type of the message based at least in part on the set of data associated with the one or more potential message types; and
  editing the one or more data fields based at least in part on the message type.

15. The communications management system of claim 10, wherein the operations further comprise:
  validating, prior to accessing and editing, the message based at least in part on the one or more conditions associated with the one or more potential message types, wherein, for an invalid method, the validating performs at least one of deleting the message and outputting a message to a sender of the message indicting the invalidity of the invalid message.

16. An aircraft, comprising:
  one or more onboard systems configured to send one or more messages associated with the aircraft;
  a computing system comprising one or more processors and one or more memory devices located on the aircraft, the one or more memory devices storing instructions that when executed by the one or more processors cause the one or more processors to perform operations comprising:
  receiving, by one or more computing devices included in an aircraft from at least one of the onboard system or a remote system that is remote from the aircraft, a message comprising a plurality of data fields containing data associated with the message;
  accessing, by the one or more computing devices, a set of configuration data, wherein the set of configuration data comprises a first set of data identifying a plurality of different message types, one or more message structures that can be associated with each of the different message types, and different parameters associated with each of the different message structures including one or more conditions for processing data fields of messages associated with each of the message structures, wherein each condition includes an action to be performed on a specified data field;
  determining, based on the plurality of data fields included in the message including expected data fields matching one of the plurality of message types, a potential message type of the message;

determining, by the one or more computing devices, a determined message structure of the message based at least in part on the data fields and the determined potential message type;

processing, by the one or more computing devices, the message based at least in part on the determined message structure, and wherein processing comprises:

identifying one or more parameters associated with the determined message structure, and accessing and editing, by the one or more computing devices, one or more of the data fields to perform an identified action including at least one of a removal, redaction, or replacement of the data contained in the respective data fields based at least in part on the one or more conditions associated with the one or more potential message types; and generating and outputting, by the one or more computing devices, a filtered message that is based at least in part on the processed message.

17. The aircraft of claim 16, wherein the set of configuration data is included in an XML formatted file.

18. The aircraft of claim 16, wherein the message structure of the first message is a tree data structure comprising a first data field and a second data field, wherein the first data field comprises a link to the second data field, and wherein processing one or more of the data fields comprises:

processing, by the one or more computing devices, the first data field;

determining, by the one or more computing devices, to process the second data field based at least in part on the link to the second data field; and processing, by the one or more computing devices, the second data field.

19. The aircraft of claim 16, wherein processing one or more of the data fields comprises:

editing the one or more data fields to perform at least one of a removal, redaction, or replacement of the data contained in the respective data field based at least in part on the one or more conditions.

20. The aircraft of claim 16, wherein the operations further comprise: validating, prior to accessing and editing, the message based at least in part on the one or more conditions associated with the one or more potential message types, wherein, for an invalid method, the validating performs at least one of deleting the message and outputting a message to a sender of the message indicting the invalidity of the invalid message.

* * * * *